(12) United States Patent  
DeLorme et al.

(10) Patent No.: US 7,834,910 B2  
(45) Date of Patent: Nov. 16, 2010

(54) METHOD AND APPARATUS FOR PANORAMIC IMAGING

(75) Inventors: David M. DeLorme, 27 Lambert Rd., Freeport, ME (US) 04038; James G. Peterson, Yarmouth, ME (US)

(73) Assignee: David M. Delorme, Freeport, ME (US)

( * ) Notice: Subject to any disclaimer, the term of this patent is extended or adjusted under 35 U.S.C. 154(b) by 1295 days.

(21) Appl. No.: 11/365,141

(22) Filed: Mar. 1, 2006

(65) Prior Publication Data

US 2007/0206945 A1    Sep. 6, 2007

(51) Int. Cl.  
*H04N 5/225* (2006.01)

(52) U.S. Cl. .................. 348/218.1; 348/36; 348/222.1; 348/294

(58) Field of Classification Search ............. 348/36–39, 348/148, 218.1, 222.1, 294  
See application file for complete search history.

(56) References Cited

U.S. PATENT DOCUMENTS

| | | | |
|---|---|---|---|
| 5,023,725 A | 6/1991 | McCutchen | |
| 5,185,667 A | 2/1993 | Zimmerman | |
| 5,657,073 A * | 8/1997 | Henley | 348/38 |
| 5,703,604 A | 12/1997 | McCutchen | |
| 6,118,454 A | 9/2000 | Oxaal | |
| 6,157,385 A | 12/2000 | Oxaal | |
| 6,252,603 B1 | 6/2001 | Oxaal | |
| 6,320,584 B1 | 11/2001 | Golin et al. | |
| 6,323,858 B1 | 11/2001 | Gilbert et al. | |
| 6,323,862 B1 | 11/2001 | Oxaal | |
| 6,337,683 B1 | 1/2002 | Gilbert et al. | |
| 6,654,019 B2 | 11/2003 | Gilbert et al. | |
| 6,683,608 B2 | 1/2004 | Golin et al. | |
| 7,023,913 B1 * | 4/2006 | Monroe | 348/143 |
| 2001/0040671 A1 * | 11/2001 | Metcalf | 353/94 |
| 2002/0046218 A1 | 4/2002 | Gilbert et al. | |
| 2004/0021792 A1 * | 2/2004 | Yasui | 348/373 |
| 2006/0053534 A1 * | 3/2006 | Mullen | 2/456 |
| 2007/0097206 A1 * | 5/2007 | Houvener et al. | 348/26 |

OTHER PUBLICATIONS

One-Shot Virtual Tours, http://www.0-360.com, Jul. 21, 2005.  
BYTE.com, Articles May 1995, "See You Around".  
Excerpts from The GPS/Imaging/GIS Project, The Center for Mapping. Ohio State University, Columbus, OH, Dec. 1991.

* cited by examiner

*Primary Examiner*—Gevell Selby  
(74) *Attorney, Agent, or Firm*—Patricia M. Mathers

(57) ABSTRACT

Camera system and methods to capture panoramic imagery from a camera mounted on a moving platform, using low-cost digital image sensors. The panoramic imagery appears seamless and natural to the eye. The panoramic imaging system and methods are specifically designed to accommodate the long acquisition times of low-cost digital image sensors, despite the motion of the camera during image capture. Pairs of cameras are arranged about an axis and a pairwise firing sequence enables capturing a series of adjacent images without gap or overlap. Additionally, when combined with suitable supplemental sensors, the image data provide location information about objects in the image for use in elementary photogrammetry.

16 Claims, 14 Drawing Sheets

METHOD AND APPARATUS FOR PANORAMIC IMAGING

BACKGROUND INFORMATION

1. Field of the Invention

The present invention relates to the field of wide-view imagery. More particularly, the invention relates to wide-view imagery captured from a moving platform.

2. Description of the Prior Art

A variety of photographic systems that create panoramic images and even full spherical images are commercially available. Some of these systems use a single lens or mirror, such as the 0-360 One-Click Panoramic Optic. One disadvantage of such systems is that a lens or mirror creates the circular image. As a result, little more than half of the typically rectangular sensor is actually used. Furthermore, the resolution is limited to that of a single sensor—typically about 6 megapixel for reasonably high-end cameras. Other systems, such as immersive camera systems, stitch together pairs of hemispherical images captured with 180-degree fisheye lenses, correcting for the inherent distortion of such lenses. Having to use a fisheye lense is a disadvantage, because such lenses are expensive and distort the image considerably near the edges. While the panoramic mirrors on the market are far less expensive than fisheye lenses, images taken with panoramic mirrors have similar distortion. Still other systems use a wide variety of geometric arrangements of camera elements to achieve extreme wide angle or spherical views. An example of this is the dodecahedron arrangement of camera elements disclosed by McCutchen in U.S. Pat. No. 5,023,725. As is the case with other prior art, this configuration does not use the full sensor. Also, if this configuration is used in a moving environment, expensive high-speed sensors are required.

Any arrangement of the cameras and lenses described above may be used in a moving environment for full video imaging, that is, for capturing images at a speed of at least 15 frames per second, provided that all pixels in the image are captured nearly simultaneously. Cameras produced by Point Grey Research of Vancouver, B.C. are examples of such full-video-capable cameras that are commercially available. The primary and common disadvantage of this camera, as well as the various prior art cameras and imaging systems mentioned above is cost. In order to take images from a moving platform, all of the systems listed above require relatively expensive high-speed sensors.

Finally, software programs are available that allow one to create panoramic images with conventional cameras by stitching individual images into panoramas or 360-degree images. This approach has disadvantages in that the programs are very difficult and time consuming to use.

What is needed, therefore, is an imaging system that is capable of capturing wide-view images from a moving platform, with little or no distortion. What is further needed is such an imaging system that is as low-cost as possible.

BRIEF SUMMARY OF THE INVENTION

It is an object of the invention to provide a low-cost, wide-view imaging system that captures wide-view images from a moving platform, with little or no distortion. This object is achieved by providing an imaging method and system for capturing a wide-view image from a moving platform, using conventional, inexpensive sensor components. The images captured using the method and imaging system of the present invention show little distortion caused by the motion of the camera relative to the subject at the time of capture. Furthermore, the little distortion that is introduced has no discontinuities and can be compensated for during interpretation of the images.

The imaging system according to the invention comprises a compound camera that includes a plurality of single low-cost cameras, a memory means, a computer interface means, and a central processor with means for controlling the firing order of the plurality of cameras. The imaging method comprises a method of sequentially firing pairs of the low-cost cameras. For a full panoramic view, an even number of low-cost cameras are arranged in a ring to form the compound camera. Each low-cost camera faces outward and has a field of view that captures a portion of the panoramic image. The field of view of the lenses provides adjacent images that abut each other or overlap very slightly. Ideally, six cameras are used to form the compound camera, because this number of cameras provides a reasonable amount of data, yet is still inexpensive. As few as four or even two cameras may also be used. As few as two or four cameras could also be used, but these configurations would require cameras with fisheye lenses, which are costly. The resolution of the images obtained with such lenses would also be lower. A configuration of eight or ten cameras may also be used, but this may unnecessarily increase the cost of the imaging system.

The low-cost camera according to the invention uses inexpensive, mass-produced CMOS image sensors, such as those commonly used in today's cell phones. Such image sensors typically have long image acquisition times (as much as $\frac{1}{15}^{th}$ of a second). In that amount of time, a vehicle moving at 40 mph will have traveled approximately 4 feet. Images taken of that moving vehicle with a conventional camera using such inexpensive CMOS image sensors will show distortion. For example, if the image sensor of a conventional camera scans in the vertical direction, that is, has horizontal scan lines because it scans row by row and the rows are oriented horizontally, the resulting image exhibits a form of skewing that gives vertical objects an apparent lean. Furthermore, the amount of lean of an object depends on its distance from the camera, thus making the distortion impossible to correct in an automated post-processing of the image.

CMOS image sensors typically used in high-volume consumer applications have the advantage of low cost, but perform poorly in motion photography. This is because this class of image sensors, unlike CCDs and more expensive CMOS devices, does not have memory behind each pixel or sensor element. When an image capture is initiated, the light intensity measured by each pixel is read sequentially across each row, row-by-row. The typical time to complete a scan of the entire image sensor is $\frac{1}{30}$ or $\frac{1}{15}$ second. The shutter speed, that is, the time each pixel is allowed to gather light from the scene, is dependent on the amount of available light, and is generally much shorter than the scanning time, with a typical time of $\frac{1}{1000}$ second.

To illustrate why a sensor with a shutter speed of $\frac{1}{1000}$ second still requires $\frac{1}{15}$ second to scan an image, consider an image sensor with about 1 million pixels arranged as 864 rows with 1,152 pixels in each row. Also assume that the sensor data is read by a scan clock that reads 1,152 pixels (1 row) in $\frac{1}{864}$ of $\frac{1}{15}$ second, or 77 microseconds. CMOS image sensors typically use a rolling electronic "shutter", whereby a control signal enables or disables the pixel from gathering light. Each row has a shutter. At the start of the image capture, the first row shutter enables the pixels for gathering light. After 77 microseconds, the second row pixels are enabled. After an additional 77 microseconds, the third row pixels are enabled, and so on. Meanwhile, the first row pixels have been steadily gathering light. After $\frac{1}{1000}$ second has elapsed, the first row shutter is disabled and the scan clock begins reading the first row pixel data and transmitting the data for image processing. As stated, this takes 77 microseconds, after which the second row shutter is disabled and its pixels are scanned. This sequential processing continues until all 864 rows are scanned for a total of 1/15 second (plus the initial 1/1000 second shutter period applied to the first row), even though the shutter of each row was only enabled for 1/1000 second.

With a fast shutter speed of 1/1000 second, each individual row of pixels records an accurate snapshot of the scene presented to it and does indeed freeze any motion. The relatively long period between rows, however, causes each row to freeze its portion of the scene at successive times. Consider a camera mounted to a moving platform, such as a vehicle, aimed to an angle not directly in line the vehicle's motion, with the rows of the image sensor oriented horizontally and a scanning progression from the top row to the bottom row. As the scan proceeds down the pixel rows, the vehicle motion will continually shift the scene, resulting in a series of row snapshots. If the vehicle is moving forward and the camera is aimed out to the right side, the scene will appear to move towards the right of the image sensor throughout its scan. The net result is a leftward tilt in the image of vertically oriented objects, such as buildings, utility poles, trees, etc. The degree of tilt is related to the speed of the vehicle, the distance of the object from the camera, and the angle of the object with respect to the direction of motion; closer objects have faster relative motion and tilt more than objects that are farther away. Objects perpendicular to the image sensor have the fastest relative motion and greatest tilt. Objects toward the front or rear of the vehicle have two motion components, one moving toward or away from the image sensor, the other moving past the image sensor. As the angle of the object to the front or rear increases, the tilt effect becomes less, but a distortion in the size of the object becomes apparent. The object appears to increase or decrease in a vertical direction, again related to the distance of the object from the camera. As a result, an object with constant width that is toward the front of the vehicle appears to grow wider from top to bottom, a distortion that is much more noticeable with relatively tall vertical objects.

The method and imaging system according to the invention compensate for the effects of tilt and size distortion by orienting the camera image sensor such, that the rows are scanned vertically. Conventional image sensors have a rectangular pixel arrangement, with the rows running along the longer dimension. The image sensor is rotated 90 degrees, so that the rows are oriented vertically. This results in a narrowing of the horizontal field of view. This disadvantage is overcome by using multiple image sensors to capture more of the scene. Assume a symmetric ring composed of an even number of cameras with half of the cameras aimed to the right and half aimed to the left of the direction of vehicle motion, with the image sensors oriented so that the rows run vertically. Assume also that the cameras are aimed at angles relative to each other to provide a continuous unbroken panoramic scene without gaps, in other words, each camera has a field of view such that the edges of the image captured by each camera just touch or overlap slightly with the edges of adjacent images. The sensors of all cameras scan in the same direction, either from front to back or back to front. Thus, if the first rows of the right-aimed sensors are toward the front of the vehicle, then the left-aimed sensors are inverted 180 degrees so that their first rows are also toward the front. If one side should have its first row towards the front, and the other side its first row towards the rear, the image from the cameras on the one side would be compressed and the image from the cameras on the other side stretched, resulting in a non-symmetric scene and poor image at the front and rear.

With the vehicle moving forward, a problem arises if all cameras are fired simultaneously. When scanning front to back, with all first rows oriented toward the front, as stated above, the last rows record their slice of the scene closer to the front, causing a compressed image. This also leaves a gap between the last row of each image sensor and the first row of its adjacent image sensor. Again, this gap is larger nearer a point directly perpendicular to the direction of motion and diminishes for cameras aimed towards the front or rear. When scanning back to front, on the other hand, with all first rows oriented toward the rear (with the vehicle moving forward), the last rows end up forward of the first row of the adjacent camera, resulting in a band of the scene being captured by both cameras. This band or overlap is a waste of field of view of each camera and, because the size of the band changes with vehicle speed, is impossible to compensate for with simple fixed camera aiming.

Both of these difficulties, that is, the gap in the coverage when scanning in one direction and the overlap band of adjacent images when scanning in the other direction, are solved by the imaging method and imaging system according to the invention. As mentioned above, the compound camera comprises a plurality of individual, low-cost cameras that are arranged in a ring configuration to provide a 360 degree panoramic view. For illustration purposes, assume that the compound camera has six cameras. Starting at a point designated as the front of the ring and proceeding in a clockwise direction, the cameras are designated A1, B1, C1, C2, B2, and A2. The imaging method controls the triggering of the individual cameras so that pairs of cameras are fired in a particular sequence to minimize the time difference between the scanning of the last row in one camera and the scanning of the first row in the next camera. According to the method, cameras A1 and A2 are fired, then cameras B1 and B2, and finally, cameras C1 and C2. Thus, the cameras are sequentially fired in left-right pairs, such that, just as the last rows in the sensor of the first pair of cameras A1 and A2 has completed its scan, the sensors in the next pair of cameras B1 and B2 are fired, and so on. This firing sequence results in a smooth, continuous image without gaps for the compressed image case and without overlap bands in the stretched image case. Furthermore, since the compression or stretching of the image reduces as the angle approaches the direction of motion, the image is continuous without gaps or overlaps.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE INVENTION

The present invention will now be described more fully in detail with reference to the accompanying drawings, in which the preferred embodiments of the invention are illustrated. This invention should not, however, be construed as limited to the embodiments set forth herein; rather, the illustrations are provided so that this disclosure will fully convey the scope of the invention to those skilled in the art.

Figure 1:
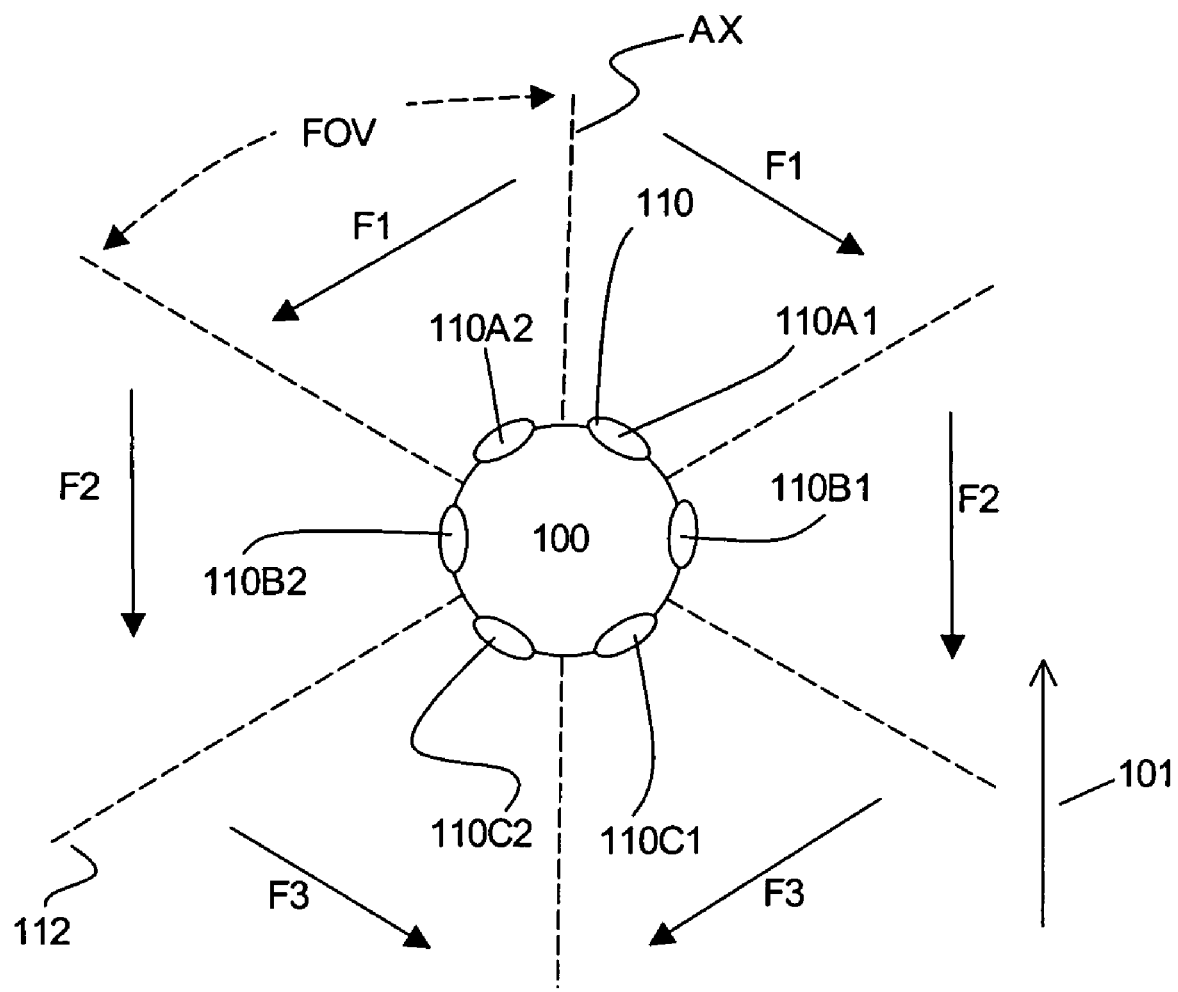
FIG. 1 illustrates the compound camera and the firing sequence of the single cameras.

FIG. 1 is a top plane diagrammatic view of a compound camera 100 according to the invention. The compound camera 100 comprises a plurality of low-cost single cameras 110. In the Preferred Embodiment of the invention, the compound camera 100 has pairs of single cameras 110 arranged about an orientation axis AX as shown. The orientation axis AX is an imaginary line that extends from a first axis end at the front center position to a second axis end at the rear center position of the compound camera 100. In the embodiment shown, the pairs of single cameras 110 include three pairs or six single cameras, designated as 110A1, 110B1, 110C1, 110A2, 110B2 and 110C2, and the two cameras of any one pair are positioned in mirror locations about the orientation axis AX. The field of view FOV of each camera 110 is delineated by dashed lines 112. An even number of single cameras 110 is required for a 360-degree panoramic image, in order to avoid a mismatch of one image captured by one single camera with images of adjacent single cameras. For reasons of clarity, the term "image" shall refer hereinafter to the picture captured by a single camera 110; and, unless otherwise stated, the term "panoramic image" shall refer to a picture composed of two or more images captured by a plurality of the cameras 110. It is understood that, although the compound camera 100 described herein has six single cameras 110, a greater or lesser number of the single cameras 110 may be used, such as, for example, two, four, eight, or ten cameras. The number of single cameras 110 chosen for a particular application will be determined by the cost restraints of the imaging system and the amount of data to be collected. For most applications, the optimal configuration is six single cameras 110. In some applications, it may be desirable to have an incomplete ring of single cameras 110. For example, when mapping terrain to one side of a road, it may be desirable to use only the single cameras 110A1, 110B1, and 110C1, for example, all arranged on one side of the orientation axis AX so as to capture images from only one side of a road.

Figure 2:
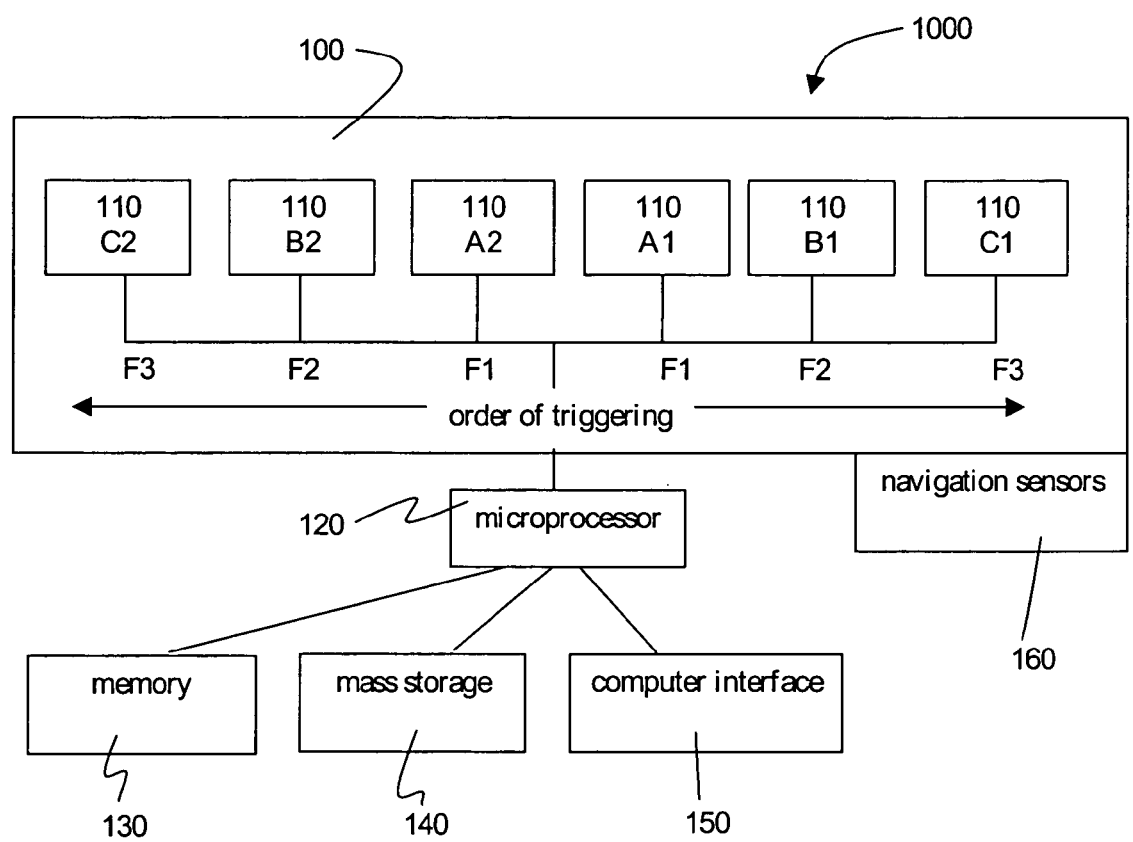
FIG. 2 is a block diagram of the imaging system according to the invention.

FIG. 2 is a block diagram of an imaging system 1000 according to the invention, comprising the compound camera 100, a central processing unit 120, a memory means 130, a mass storage means 140, and a computer interface means 150. The diagram illustrates the firing sequence F1-F3 of the individual cameras 110. Cameras 110A1 and 110A2 fire together at a first firing F1; cameras 110B1 and 110B2 fire together at a second firing F2; and cameras 110C1 and 110C2 fire together at a third firing F3. Each of the single cameras 110 is connected to the central processor 120, as are the memory means 130, the mass storage means 140, and the computer interface means 150. It is important that each input from each image sensor (discussed below) be able to be stored within the firing period. Given that constraint, any type of computer memory that is suitably fast for storing the single exposure images from all the single cameras 110 within the acquisition time period may be used as the memory means 130. The images for a single exposure are stored in the memory means 130 until they are either transferred to the mass storage means 140, or transferred to a host computer (not shown) via the computer interface means 150, which may be any suitable conventional computer interface means, such as, for example, USB. The computer interface means 150 connects the imaging system 1000 to another computer, which may serve for remotely controlling the compound camera 100, storing data directly, or accessing the data previously collected by the compound camera 100 and stored in the mass storage means 140.

Sensor means 160 for recording external or non-image data may be connected directly or indirectly via the compound camera 100 to the central processor 120 for collecting position and orientation data or other information for each image captured. Examples of such sensor means 160 include, but are not limited to, sensors for recording position, heading, and/or orientation, such as: global positioning system (GPS) device, compass, altimeter, tilt sensor, accelerometer, gyroscope, and speedometer; sensors for recording ambient conditions, such as temperature, salinity, visibility, brightness, etc.; sensors for recording date, time, and sound; as well as and various other sensors. Such sensor means, referred to hereinafter generally as "supplemental sensor means" may be incorporated into the camera housing, held separately from the camera housing and in communication with the computer interface means 150 or the CPU 120. The data from these supplemental sensor means 160 are collected simultaneously with data from the captured images and are linked to the images, so that it is it possible to obtain the sensor data that corresponds to each captured image. For example, when capturing images of terrain, the geographic location data of each image is also captured with the sensor means 160 and stored in a manner that enables one to determine the precise location of each particular image. Knowing the location of the compound camera 100 at the time of the exposure enables an electronic map to be automatically annotated with the camera locations. Additionally, knowing the orientation of the single camera 110 during each exposure enables any object, visible in two or more pictures, to be placed on the map, using simple and well-known photogrammetry techniques. Furthermore, knowing the speed and heading of the compound camera 100 during the exposure enables the panoramic images to be visually corrected and allows more accurate measurements to be taken from the images.

Figure 3:
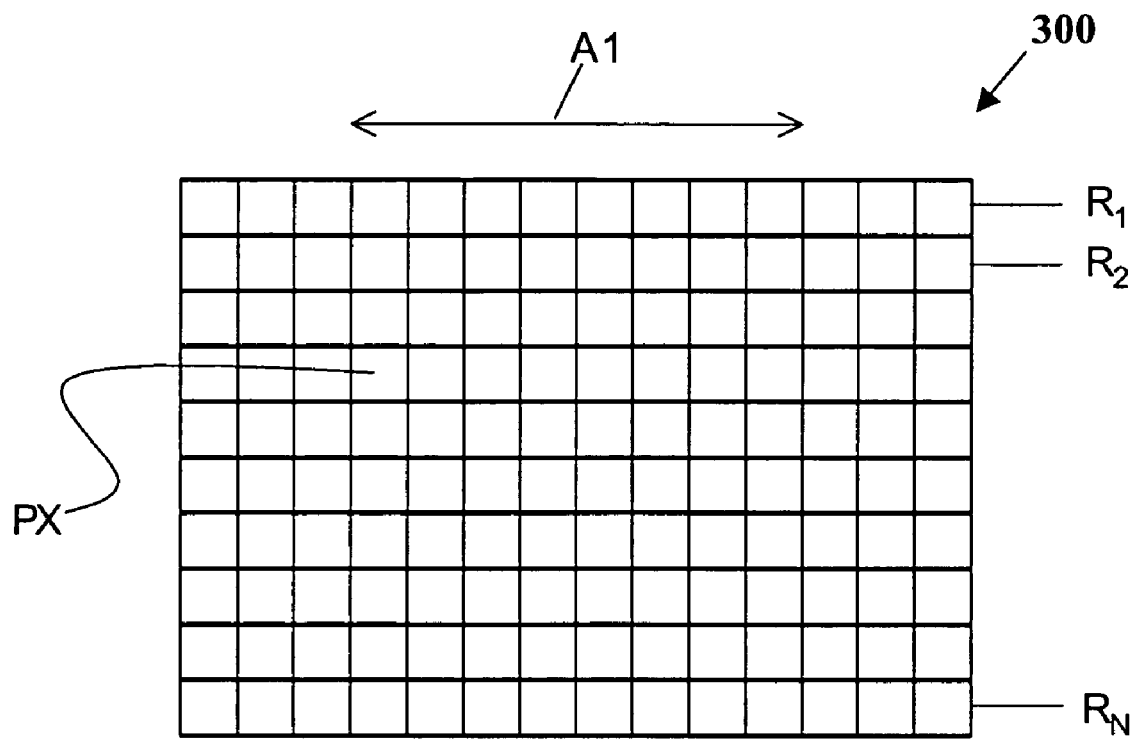
FIG. 3 shows a CMOS sensor with the conventional orientation, with rows running horizontally. (Prior Art)
Figure 4:
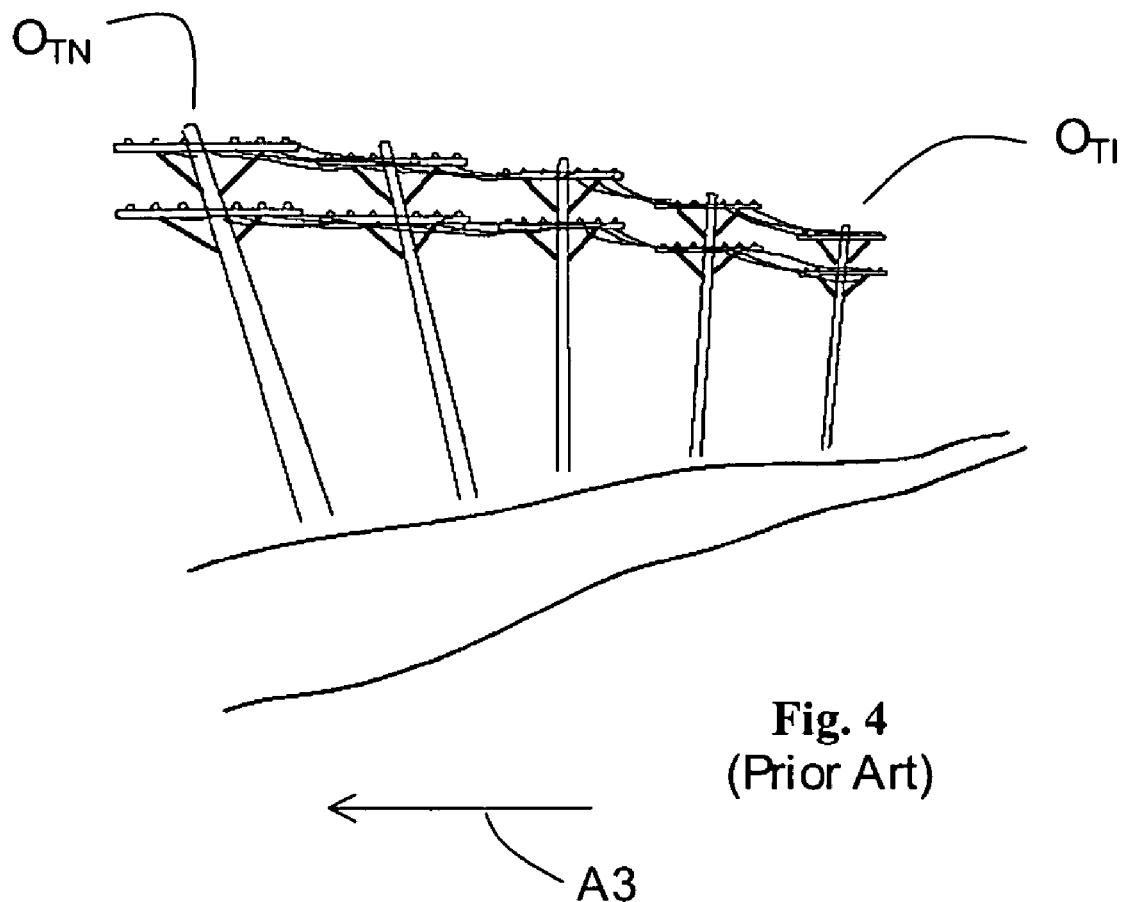
FIG. 4 illustrates the tilt of a vertical object photographed with a camera using a conventional CMOS sensor (prior art).

FIG. 3 (prior art) is an illustration of an inexpensive, conventional sensor that is used as an image sensor 300 with each single camera 110. This sensor may be a low-cost CMOS sensor or other type of low-cost sensor. The pixels PX or image elements that are arranged in rows $R_1 \ldots R_n$ and columns. Conventionally, the sensor in the conventional camera is arranged as shown, with rows $R_1 \ldots R_n$ running horizontally and the conventional direction of scanning indicated by scanning arrow A1. Scanning arrow A1 is double-headed, because scanning may be done in either direction across the row, depending on the particular application. Unlike CCD sensors and more expensive CMOS sensors, both types of which have memory capacity behind each pixel PX, the low-cost sensor used as the image sensor 300 with the single camera 110 either does not have such memory capacity, or any memory capacity it does have is too slow to provide the desired image quality. When an image capture is initiated, the light intensity measured by each pixel PX is read sequentially across the rows $R_1 \ldots R_n$, row by row. Each row $R_x$ is read relatively fast, in 67 microseconds, thus creating no noticeable distortion due to motion. As each successive row $R_x$ is turned on, however, the camera 100 has traveled forward a certain distance, as indicated by travel arrow A3 in FIG. 4, and each row $R_x$ is frozen with a successive shift in view. This shift results in a tilt of an object in the image captured, and the tilt is particularly noticeable when the object is a tall vertical object $O_T$, such as a tall building or a telephone pole. See FIG. 4 (prior art). In an image that contains a series of tall objects $O_T$, each object $O_T$ will appear to have a slightly different tilt, as shown in FIG. 4. Objects that are far away from the camera 110 will appear to be almost vertical, whereas the closer the objects $O_T \ldots O_N$ are to the camera 110, the greater the apparent tilt.

Figure 5:
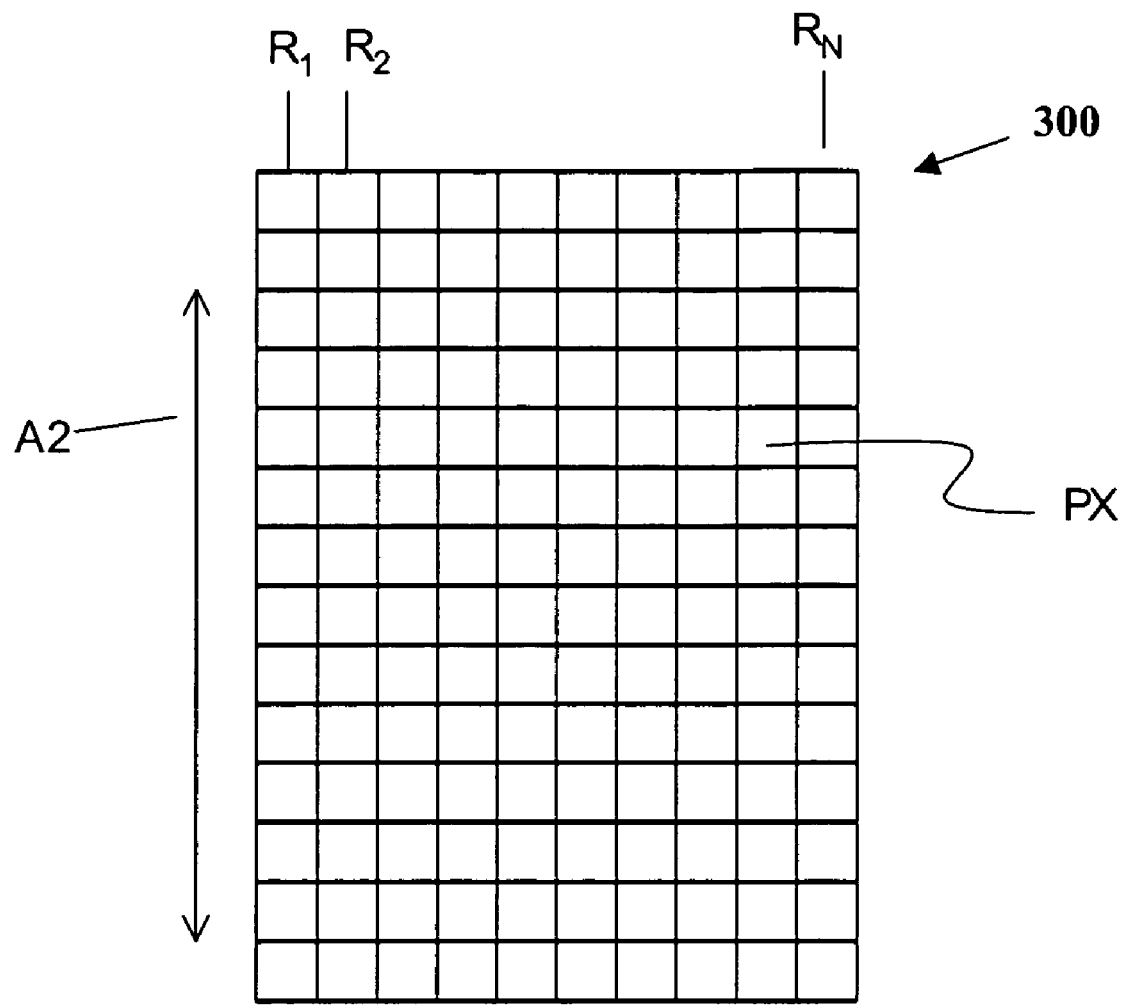
FIG. 5 shows the CMOS sensor of FIG. 3, rotated 90 degrees, with the rows running vertically, for use in the compound camera of FIG. 1.
Figure 6:
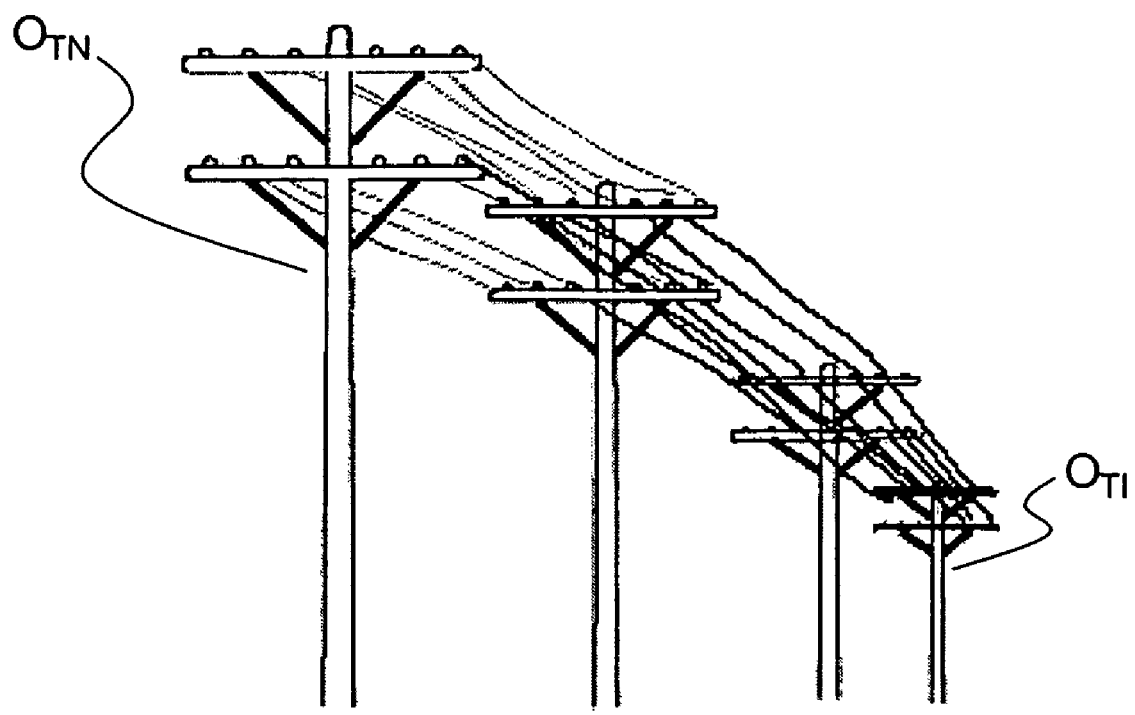
FIG. 6 illustrates the image of a vertical object photographed with the camera according to the invention shows the camera mounted on a moving platform.

FIG. 5 illustrates the conventional CMOS sensor re-oriented for use as the image sensor 300 in the compound camera 100 according to the invention, with the rows $R_1 \ldots R_n$ running vertically and the direction of scanning indicated by a scanning arrow A2. This scanning arrow A2 indicates that scanning may be done upward or downward, depending on the application. It is important that the rows $R_1 \ldots R_n$ are scanned vertically and that all the sensors 300 scan in the same direction relative to the direction of motion of the compound camera 100, that is, either front to back or back to front, depending on the particular application. In an application in which the sensors 300 are scanning front to back, for example, the sensor 300 shown in FIG. 5 is shown in an orientation for a camera 110 on the left hand side of the longitudinal axis AX, with the rows $R_1$ and $R_2$ beginning in the upper right-hand corner. In a camera 110 mounted on the right hand side of the longitudinal axis AX, for the same application, the sensor 300 would be rotated 180 degrees as indicated by arrow A5. $R_1$ and $R_2$ would then begin in the lower right-hand corner. FIG. 6 is an illustration of an image containing a series of tall objects $O_T \ldots O_N$ all of which appear to be vertical, regardless of the distance of the particular tall object $O_T$ to the compound camera 100, which is traveling in the direction indicated by the travel arrow A3.

Figure 7:
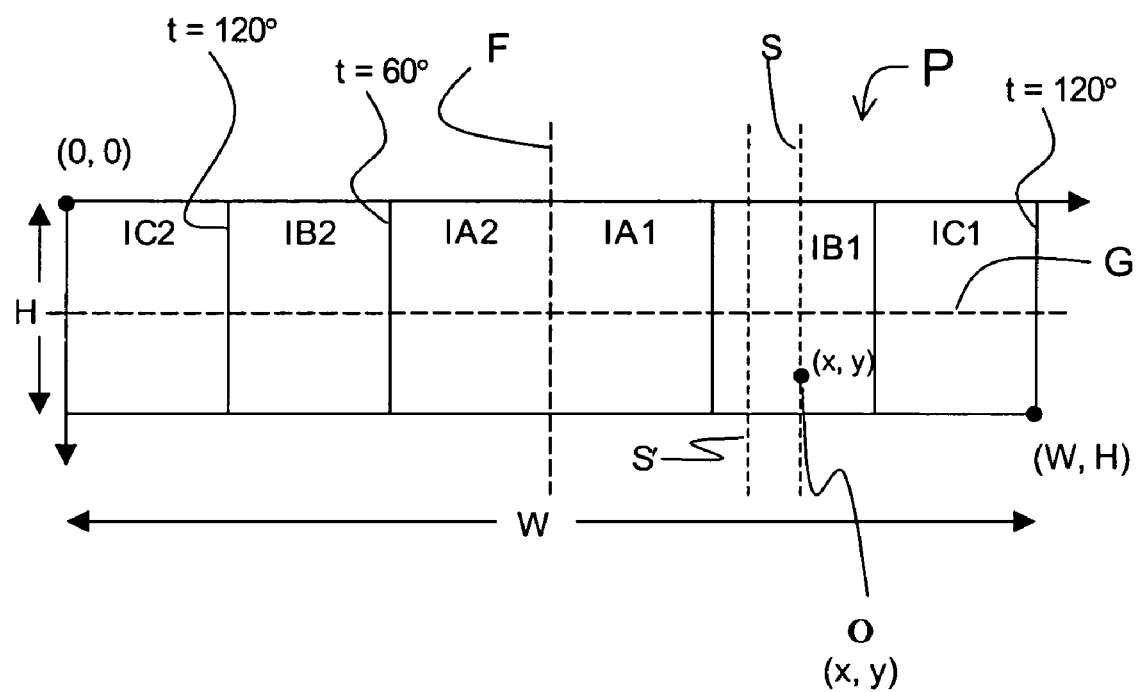
FIG. 7 illustrates the layout of the panoramic image captured by the camera of FIG. 1, showing the image portions contributed by the single cameras.

FIG. 7 illustrates the layout of a panoramic image P comprising individual images IA1, IA2, IB1, IB2, IC1, IC2 that were captured by the respective single cameras 110A1, 110B1, 110C1, 110A2, 110B2 and 110C2. A software process that will be described in more detail below combines all images into the panoramic image P that represents a cylindrical projection of the individual images IA1-IC2. The view to the front of the compound camera 100 will appear in the center and the view to the rear will appear on the extreme right and left ends of the panoramic image P. A width W and a height H of the panoramic image P are determined by the horizontal resolution, i.e., the number of pixels in the horizontal direction, and the vertical resolution, i.e., the number of pixels in the vertical direction, respectively. Generally, the width W is close to 6 times the native horizontal resolution of the single cameras 110 in portrait mode, but may be set to any reasonable value. The height H will generally be close to the vertical resolution of the single cameras 110 in portrait mode. More importantly, the pixel dimensions of the panoramic image P are chosen so that the angle or degree of the view that a pixel occupies (degree per pixel) is equal in both the horizontal and vertical directions. The relationship of W to H is expressed as follows: (W/HFOV)=(H/VFOV), where HFOV and VFOV are the horizontal and vertical fields of view. For example, if the panoramic image P is a full 360 degree ring and the width W is 3200 pixels with a vertical field of view of 90 degrees, then the height H of the panoramic image P must be 800 pixels. Still referring to FIG. 7, the vertical dashed line F represents the image from the front of the compound camera 100, while the horizontal dashed line G represents the horizon. A standard image coordinate system is used, with (0, 0) in the upper left and with the x and y values proceeding positively to the right and down respectively. If O is an observed object in the field of view, then there is a direct relationship between the angles from the front F of the compound camera 100 and from the horizon G and the x and y positions in the image. If t is the horizontal angle clockwise from the front of the camera, then the relationship of the angle t to the pixel position is: t=(HFOV)(x−W/2)/W. Similarly, if r is the vertical angle above the horizon then: r=(VFOV)(H/2−y)/H.

Figure 8:
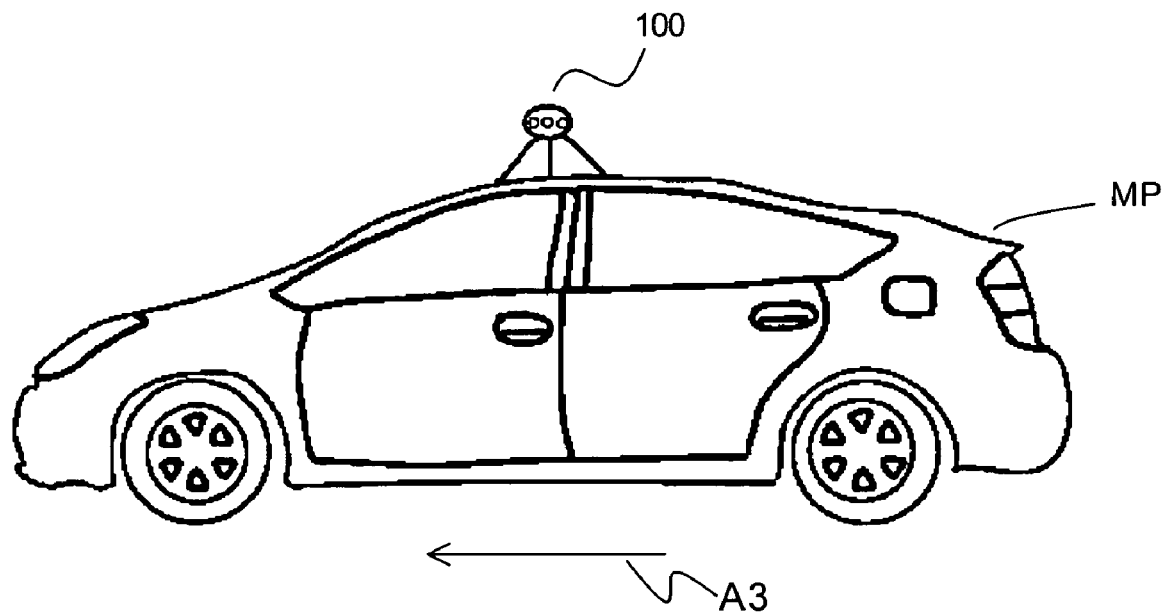
FIG. 8 shows the compound camera of FIG. 1 mounted on a moving platform.
Figure 9:
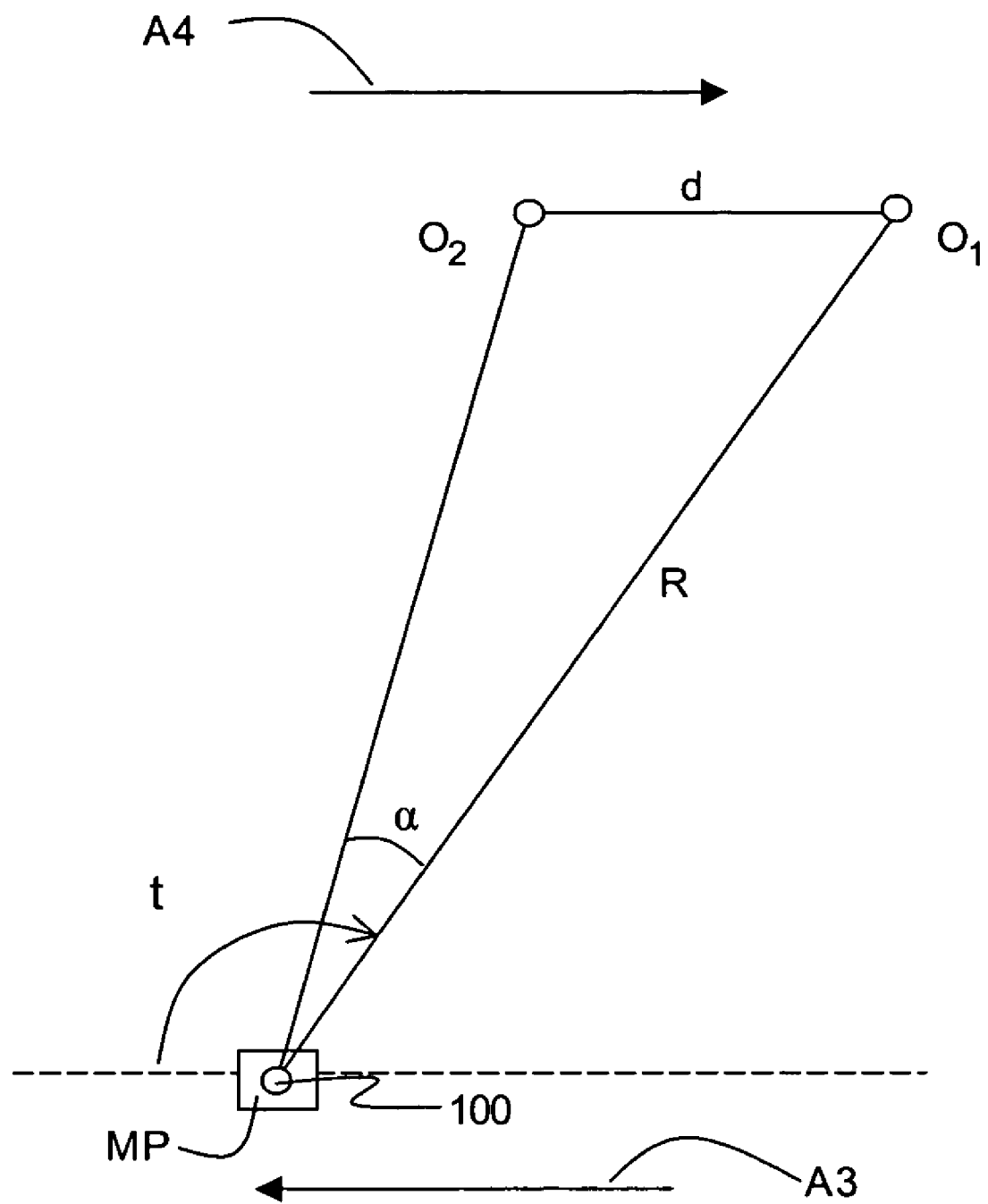
FIG. 9 illustrates the motion throughout the duration of the image capture process of the compound camera relative to an object in an image.

FIG. 8 shows the compound camera 100 mounted on a moving platform MP, which in the illustration shown is a motor vehicle traveling in the direction indicated by travel arrow A3. The fact that the camera is depicted as moving and capturing a stationary image is for illustration purposes only and does not limit the scope of the invention to that particular arrangement. It is understood that the compound camera 100 may also be mounted on a stationary platform and used to photograph moving objects. It is the relative motion between the compound camera 100 and the object O that is at issue. FIG. 9 illustrates the travel of the moving platform MP and the change in angle of view relative to the object O to be captured in a panoramic image over at time t, indicated by shift arrow A4. In FIG. 9, $O_1$ is the position of the object O relative to the compound camera 100 at the time that it is captured by the image sensor 300 and $O_2$ is the position of the object O relative to the compound camera 100 at the start of the image acquisition for the panoramic image. $O_2$ also represents the position of the object O if the compound camera 100 is not moving relative to the object O. If the time t is measured in units such that there are π units over the time required to acquire the panoramic image, then the angle to the observed object O relative to the direction of motion is t radians. An apparent shift in angular position of the object $O_2$ to $O_1$ due to motion is represented in FIG. 9 by α, and is dependent on the distance to the object O, the time t that the object O is observed by the image sensor 300, and the distance d traveled by the compound camera 100 relative to the object O, up to the time that the object O is captured. If the distance traveled by the compound camera 100 during image acquisition is D, then d=D×t/π. Because the leading edge and trailing edge of the object O are captured at different times, the apparent angular shift of those edges differs. This causes an apparent stretching or compressing distortion of the object O due to the motion of the compound camera 100. The firing sequence of the method according to the invention eliminates any abrupt distortion or discontinuities between the leading and trailing edges of adjacent images I and, despite the apparent distortion from the compressing or stretching, the panoramic image P is captured continuously, with no apparent missing or duplicated information.

The apparent distortion due to motion causes some portions of the panoramic image P to compress, while other portions are elongated or stretched. Although this apparent distortion is a function of the distance of the object O from the compound camera 100, it is correctable for a given distance or radius R from the camera. See FIG. 9. This correction may be expressed as a mapping between observed horizontal angles and the corrected angles in the panoramic image P. More specifically, for a given vertical scanline S in the panoramic image P shown in FIG. 7, a new angle is defined to map the scanline S to the corrected image. Corrected scanline S' represents the corrected image. Let t represent the observed angle measured relative to the direction of travel. The corrected angle in the corrected image is represented in FIG. 9 as (t−α). The exact relationship between t and (t−α) cannot be expressed in a simple closed form; the corrected angle (t−α), however, can be computed using numerical means. More conveniently, the corrected angle (t−α) can be adequately approximated with the following function: $A(t)=t+\frac{1}{2}[1-\cos(2t)]\arctan(D/2R)$, where D is the distance traveled by the compound camera 100 during image acquisition along travel arrow A3 and R is the distance of the object $O_1$ from the compound camera 100 for which the correction is optimized. Suitable standard image resampling methods, such as cubic convolution, or bilinear interpolation, may be employed to modify the panoramic image P.

Figure 10:
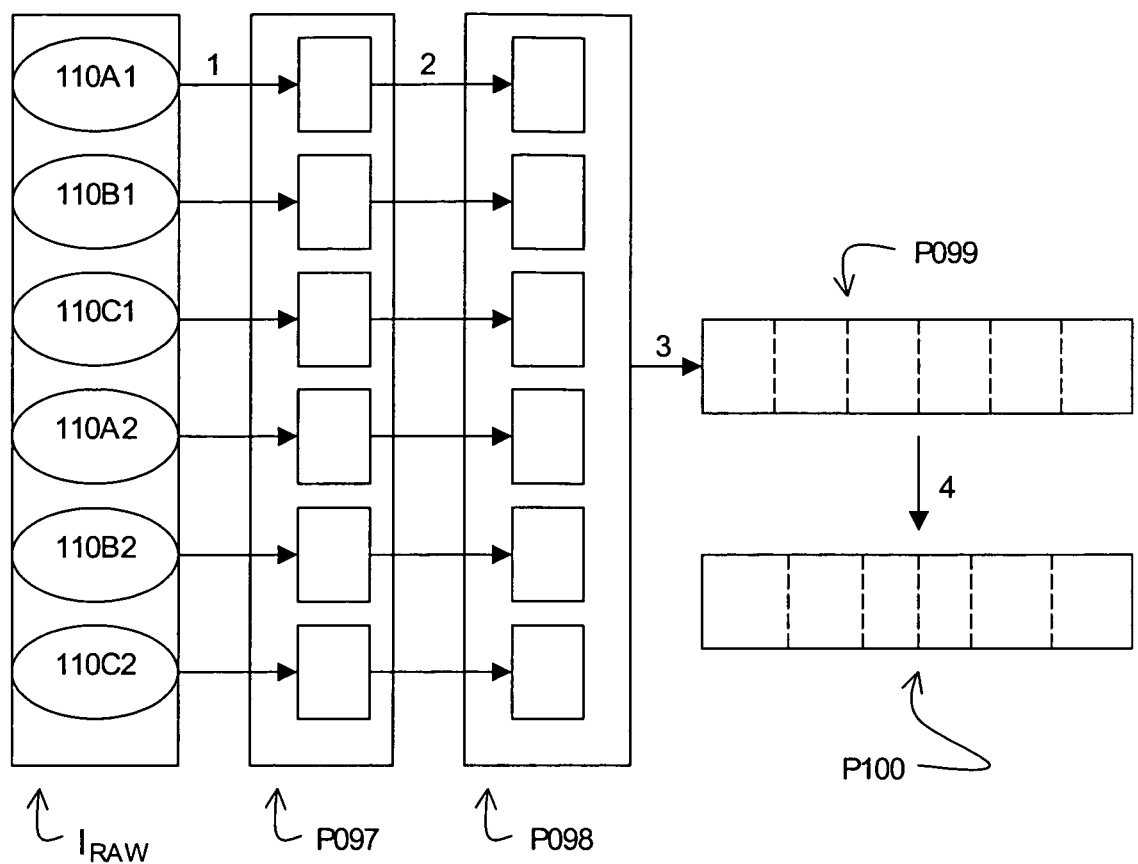
FIG. 10 is a block diagram illustrating the processing steps to create a corrected panoramic image from raw individual images.

FIG. 10 depicts the processing steps that transform the image data collected by the compound camera 100 into the panoramic view P, which, with reference to FIG. 10, shall now be referred to as a final panoramic image P100. In Step 1, raw images $I_{RAW}$ of a panoramic view are acquired from the single cameras 110A1-110C2. In Step 2, the raw images $I_{RAW}$ are processed into partial panoramic views P098, each raw image $I_{RAW}$ now being a partial panoramic image 098. The shaded area connected to each single camera 110A1-110C2 represents the partial panoramic image 098 contributed by that camera. Referring back to FIGS. 1 and 2, it can be seen that positions of these partial panoramic images 098 within the entire composite panoramic view correspond to the arrangement of the respective single cameras 110 about the longitudinal axis AX and to the triggering sequence F1-F3. The partial panoramic images 098 from the single cameras 110A and 110A2, for example, contribute the images just to the right and left, respectively, of the centerline of the composite panoramic view. In this Step 2, the images are reprojected into a cylindrical form, taking the lens model and the camera geometry into account for this reprojection. The lens model can be adequately characterized by a fifth order polynomial that maps angles to observed objects O from the center of the field of view FOV of the single camera 110 to the distance of the rendering of the object in the raw image $I_{RAW}$. Because the plurality of single cameras 110 cannot all be placed at a single point, a parallax, or apparent shift in the apparent position of objects, is created at the edges of the raw images $I_{RAW}$. This is particularly pronounced with objects close to the compound camera 100. By taking the camera geometry into account, the reprojecting of the final panoramic image P100 may be optimized for a specified distance of the observed object O from the compound camera 100. The reprojection of the raw images $I_{RAW}$ into the partial panoramic views P098 in this step uses conventional resampling methods. In Step 3, the partial panoramic views of P098 are stitched into a single composite image, referred to here as a single panoramic view P099. Standard "feathering" or other image blending techniques may be employed to minimize the appearance of seams in the composite image. The panoramic view P099 resulting from this step may be the desired final product for some applications. This single panoramic view P099 provides a convenient format, for example, for measuring angles. It is without visual discontinuities, and distortion due to motion is minimal at low speeds. In Step 4, the single panoramic view may be further refined visually to account for the motion of the camera 100, to obtain the final panoramic view P100.

Many conventional cameras and lenses may be suitable for use in the compound camera 100 according to the invention. An example of a suitable camera for the single camera 110 is created by combining the ST Microelectronics ST V6650 1.0 Megapixel Standard Mobile Imaging Architecture (SMIA) image sensor with a moderate wide angle lens, such as the Videology 3.0 mm FL model 32SN0320N. This combination provides a vertical field of view of about 88 degrees and a horizontal field of view of about 66 degrees in a portrait orientation. The SMIA architecture enables the majority of support electronics and the mass storage 140 to be separated from the compound camera 100. The benefit of this is that the size of the camera 100 can be minimized, reducing parallax effects. It also enables the computer interface 150 to be separated from the compound camera 100, allowing the compound camera 110 to be mounted on the moving platform MP, such as the roof of a vehicle, and a base unit containing the mass storage 140 and the computer interface 150 to be installed inside the vehicle.

Figure 11:
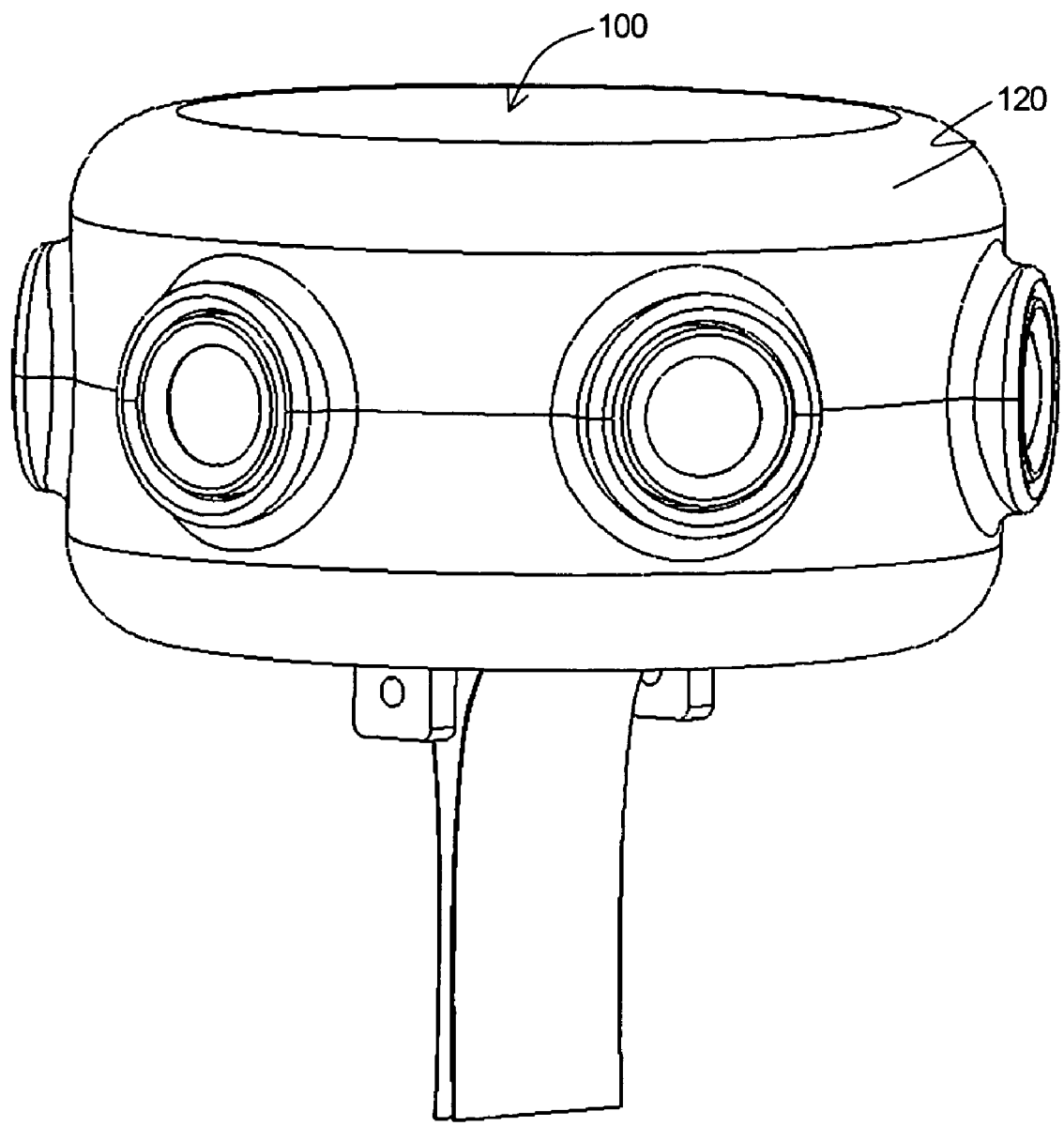
FIG. 11 is an illustration of an embodiment of the compound camera of FIG. 1, showing the arrangement of the single cameras in the housing.
Figure 11A:
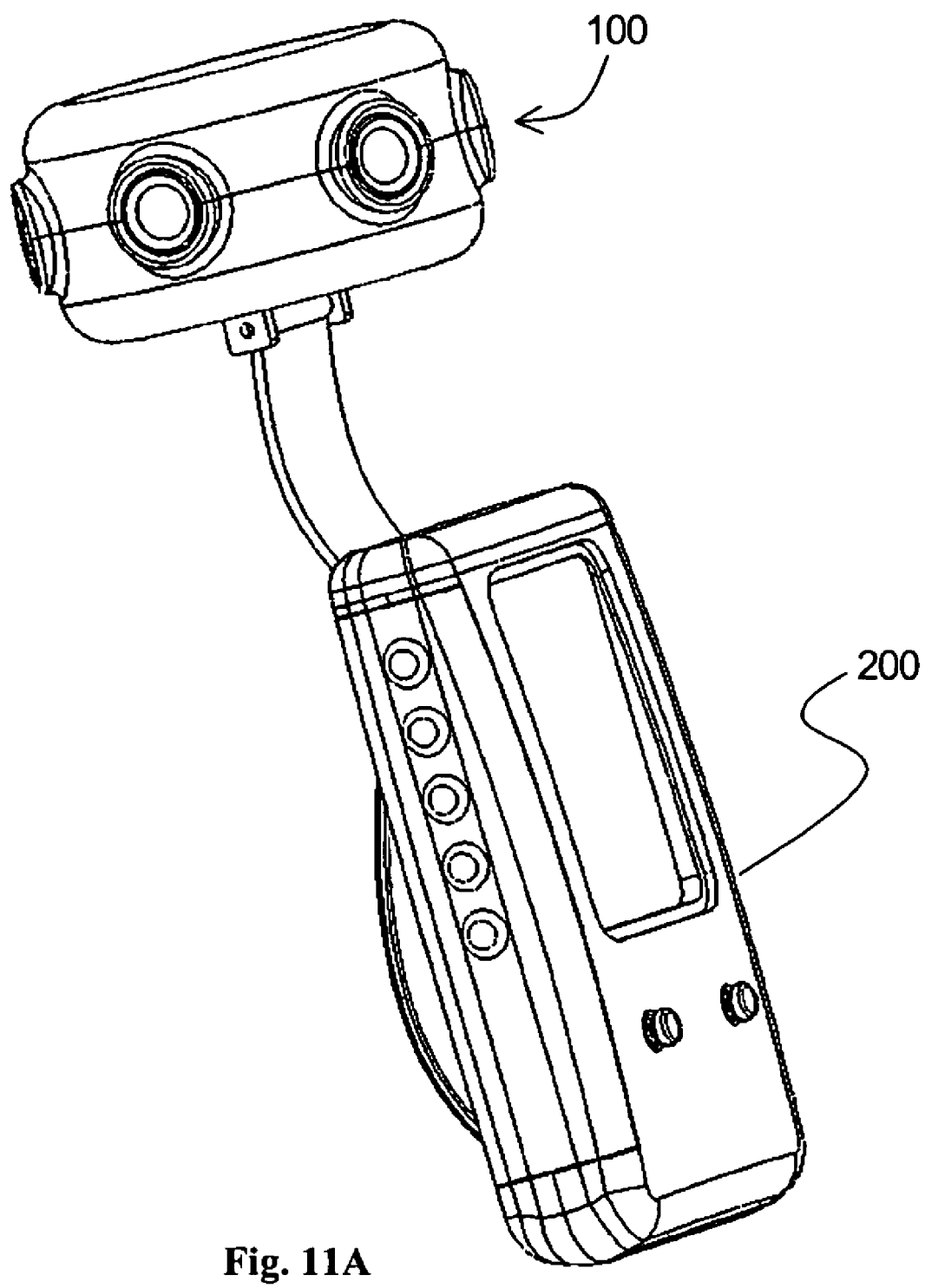
FIG. 11A is a handheld embodiment of the compound camera of FIG. 1.

FIGS. 11 and 11A are illustrations of embodiments of the compound camera 100. FIG. 11 shows the compound camera 100 enclosed within a housing 120. FIG. 11A illustrates the compound camera 100 in the embodiment of a handheld unit. The compound camera 100 is mounted on a handheld control unit 200.

Figure 12:
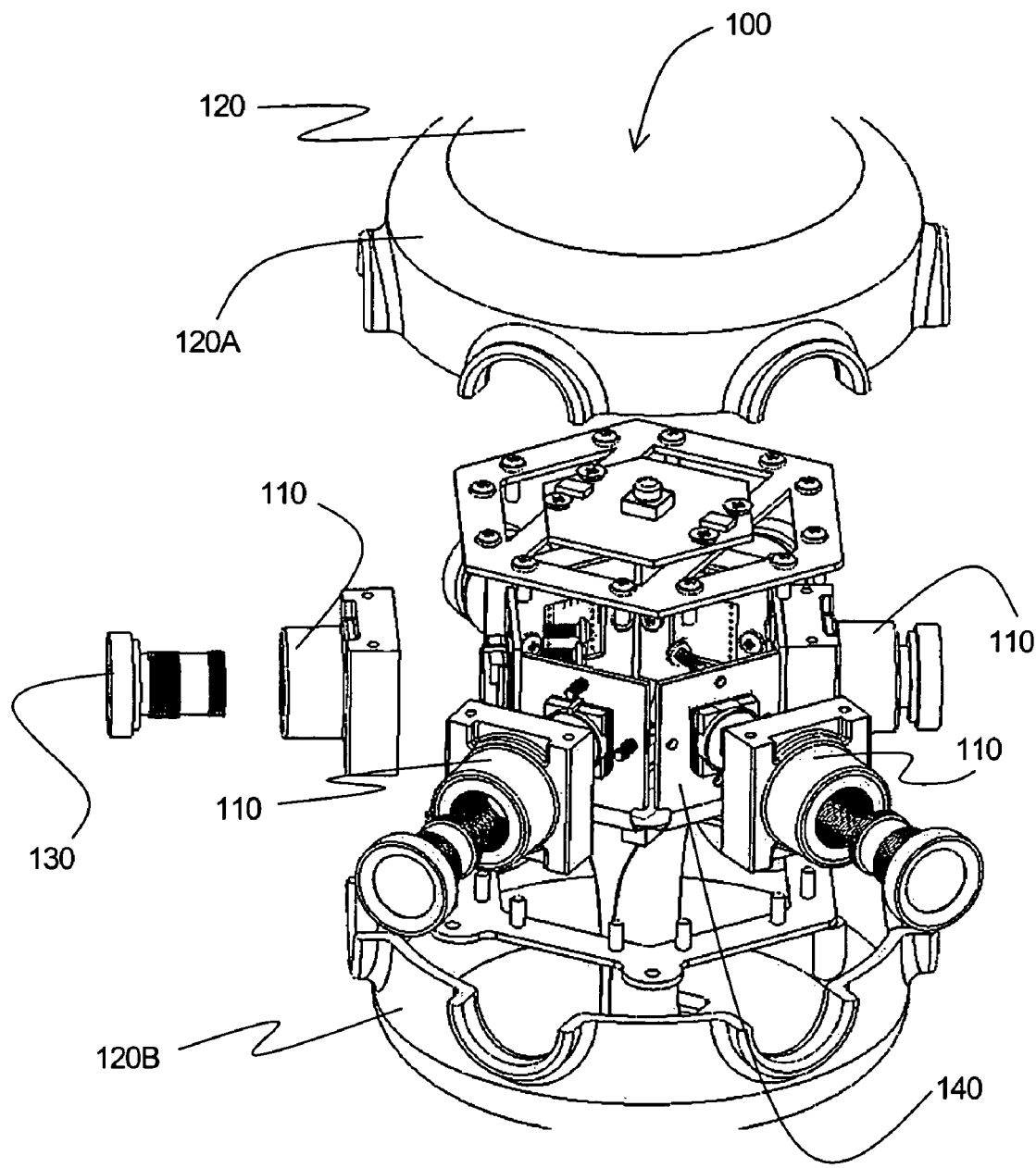
FIG. 12 is an exploded view of the compound camera shown in FIG. 11.
Figure 13:
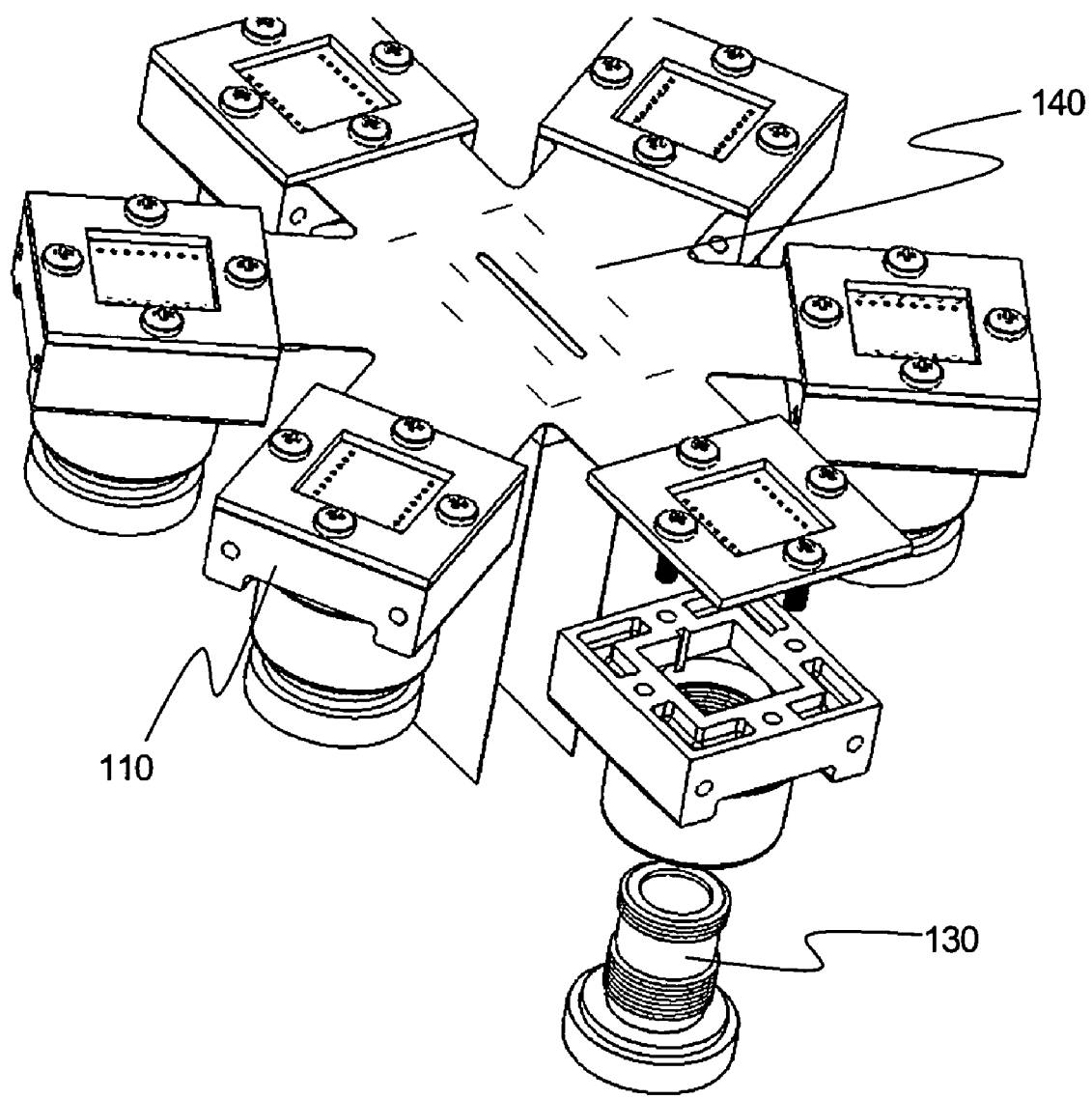
FIG. 13 illustrates the shape of the flexible circuit board.

FIG. 12 and FIG. 13 are exploded views of the compound camera 100 as shown in FIGS. 11 and 11A. The single cameras 110 with lenses 130 are mounted in the camera housing 120, which, in the embodiment shown, is a split housing having an upper housing 120A and a lower housing 120B. The cameras 110 are mounted on a single-piece flexible circuit board 140. FIG. 13 shows the flexible circuit board 140 having six flexible arms 142. One single camera 110 with a lens 130 is mounted on each of the arms 142. The arms 142 are folded downward to form a six-sided structure that fits within the housing 120. The method of mounting the single cameras 110 on the flexible circuit board 140 provides several manufacturing advantages. For one, the single cameras 110 may be assembled on a flat circuit board. This makes it easier to assemble, test, and focus the lenses. After the single cameras 110 have been tested, the flexible arms 142 are folded and the cameras 110 and flexible circuit board 140 assembled in the housing 120. This method also allows the cameras 110 to be fixed in position relative to one another during the test phase and when assembled into the housing 120. The six-sided embodiment of the compound camera 100 is shown for illustration purposes only. It should be understood that the shape of the flexible circuit board will correspond to the number of single cameras 110 to be incorporated into the compound camera 100. Thus, if eight single cameras 110 are to be incorporated, for example, the flexible circuit board would be constructed with eight arms or be octagonal in shape.

Not shown in the illustrations are the circuitry and cables that connect the compound camera 100, and the various sensors 160, if any, to a base unit which contains the microprocessor 120, the memory 130, the mass storage 140, and the computer interface 150. It should also be understood that the sensors 160, depending on the particular type of sensor and the condition or parameter being measured, may be mounted on the compound camera 100 or incorporated into the base unit.

It is understood that the embodiments described herein are merely illustrative of the present invention. Variations in the construction of the imaging system and method of capturing a wide-angle view may be contemplated by one skilled in the art without limiting the intended scope of the invention herein disclosed and as defined by the following claims.

What is claimed is:

1. A panoramic imaging system for capturing a full or partial panoramic image, said camera comprising:
    a compound camera having an orientation axis extending through said compound camera from a first axis end to a second axis end, said compound camera comprising a plurality of cameras adapted to take a plurality of images, each single camera of said plurality of cameras having an image sensor for sensing an image, said image sensor having rows, wherein a predetermined row in said image sensor is defined as row one and said image sensor is oriented so as to scan said image with vertical scan lines, starting with said row one, and wherein said image sensor of said each single camera is oriented such that said row one is closer to said first axis end than any other row in said image sensor;
    a memory means for storage of said plurality of images; and
    a controller for synchronizing a firing of said plurality of cameras according to a pre-defined firing sequence and directing storage of said plurality of images in said memory means;
    wherein said firing sequence first fires a first camera on a first side of said orientation axis, and then fires a second camera that is adjacent said first camera on said first side of said orientation axis, and wherein said each single camera has a field of view that is sufficiently wide that said plurality of images obtained in said firing sequence forms a contiguous panoramic image without a gap between any two images captured by adjacent cameras of said plurality of cameras.

2. The panoramic imaging system of claim 1, wherein said image sensor is without memory capability, wherein said memory means is adapted to receive image data from said image sensor.

3. The panoramic imaging system of claim 1, wherein said plurality of cameras includes a pair of cameras that has a first camera and a second camera, said first camera and said second camera arranged in mirror locations on each side of said orientation axis.

4. The panoramic imaging system of claim 3 further comprising a controller for synchronizing a firing of said plurality of cameras according to a pre-defined firing sequence and directing storage of said plurality of images in said memory means, wherein said plurality of cameras includes at least a first pair and a second pair of cameras, said second pair of cameras arranged adjacent said first pair of cameras, a first camera of said first pair and of said second pair being positioned to a first side of said orientation axis and a second camera of said first pair and of said second pair being positioned on a second side of said orientation axis, and wherein said firing sequence simultaneously fires said first camera and said second camera of said first pair, and then simultaneously fires said first camera and said second camera of said second pair.

5. The panoramic imaging system of claim 1, wherein said plurality of cameras includes two or more pairs of cameras.

6. The panoramic imaging system of claim 1, further comprising supplemental sensor means.

7. The panoramic imaging system of claim 6, wherein said supplemental sensor means includes a speed sensing device.

8. The panoramic imaging system of claim 6, wherein said supplemental sensor means includes a direction sensing device.

9. The panoramic imaging system of claim 6, wherein said supplemental sensor means includes an altitude sensing device.

10. The panoramic imaging system of claim 6, wherein said supplemental sensor means includes a position sensing device.

11. The panoramic imaging system of claim 6, wherein said supplemental sensor means includes sensors for collecting data on ambient conditions.

12. The panoramic imaging system of claim 1 further comprising a mass storage means for receiving and storing data from said memory means.

13. A method of capturing and processing images with a panoramic imaging system, so as to minimize the effects of motion, said method comprising steps of:
    (a) arranging a plurality of pairs of cameras that form a compound camera about an orientation axis, said orientation axis extending through said compound camera from a first axis end to a second axis end, each single camera of a pair of cameras being placed in mirror locations on opposite sides of said orientation axis, and each camera of said plurality of cameras having an image sensor, wherein said image sensor in each said single camera is oriented such that a pre-defined first row is oriented vertically and is closer to said first axis end than any other row in said image sensor;
    (b) firing said pairs of cameras according to a pre-defined firing sequence, one pair of cameras at a time;
    (c) capturing a first image from said each camera during said firing by scanning sequentially across said image sensor, row by row, wherein said scanning generates a plurality of vertical scan lines; and
    (d) processing said first image of said each single camera to create an undistorted composite panoramic view.

14. The method of claim 13, wherein said processing further comprises the step of:
    (e) correcting said first image for motion-related distortion.

15. The method of claim 14, said step (e) including the steps:
    (e1) determining a travel distance that said compound camera has traveled over an image acquisition period defined by a first instant and a second instant;
    (e2) determining an initial first distance line between an object captured by said image sensor and said image sensor at said first instant;
    (e3) determining a second distance line between said object and said image sensor at said second instant and determining an angle between said first distance line and said second distance line; and
    (e4) calculating said approximate correction angle from a function: $A(t)=t+\frac{1}{2}[1-\cos(2t)] \arctan(D/2R)$.

16. The method of 15, said processing step further comprising the steps of:
    (d1)) applying blending techniques to said first composite panoramic view; and
    (d2) reprojecting said first composite panoramic view onto a final cylindrical format to create a composite panoramic view that has no visual discontinuities.

* * * * *